(12) United States Patent
Gupta

(10) Patent No.: US 10,848,868 B2
(45) Date of Patent: Nov. 24, 2020

(54) AUDIO SIGNAL ROUTING TO AUDIO DEVICES

(71) Applicant: HEWLETT-PACKARD DEVELOPMENT COMPANY, L.P., Houston, TX (US)

(72) Inventor: Mohit Gupta, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 119 days.

(21) Appl. No.: 16/075,619

(22) PCT Filed: Feb. 21, 2017

(86) PCT No.: PCT/US2017/018690
§ 371 (c)(1),
(2) Date: Aug. 4, 2018

(87) PCT Pub. No.: WO2018/156103
PCT Pub. Date: Aug. 30, 2018

(65) Prior Publication Data
US 2019/0058948 A1 Feb. 21, 2019

(51) Int. Cl.
*H04R 3/12* (2006.01)
*H04L 12/12* (2006.01)
*G06F 3/16* (2006.01)
*G06F 3/0482* (2013.01)
*G10L 25/60* (2013.01)

(52) U.S. Cl.
CPC ............ *H04R 3/12* (2013.01); *G06F 3/0482* (2013.01); *G06F 3/165* (2013.01); *G10L 25/60* (2013.01); *H04L 12/12* (2013.01); *H04R 2420/07* (2013.01); *Y02D 50/40* (2018.01)

(58) Field of Classification Search
CPC ............ G10L 25/60; H04R 3/12; G06F 3/165
See application file for complete search history.

(56) References Cited

U.S. PATENT DOCUMENTS

| | | | |
|---|---|---|---|
| 5,896,403 A * | 4/1999 | Nagasaki ......... G06K 19/06037 | 714/752 |
| 8,150,475 B2 | 4/2012 | Gilmore et al. | |
| 8,782,122 B1 * | 7/2014 | Chang ................. H04L 67/1048 | 709/202 |
| 8,867,313 B1 * | 10/2014 | Rivlin ....................... G01S 5/30 | 367/118 |
| 9,131,335 B2 | 9/2015 | Huttunen et al. | |
| 9,775,069 B1 * | 9/2017 | Jorgovanovic .... H04W 28/0236 | |
| 2006/0135218 A1 | 6/2006 | Son et al. | |
| 2006/0253874 A1 * | 11/2006 | Stark ....................... G06F 3/038 | 725/62 |
| 2010/0197229 A1 * | 8/2010 | Yamashita ............ H04W 76/15 | 455/41.2 |
| 2012/0159011 A1 | 6/2012 | Rostaing et al. | |

(Continued)

OTHER PUBLICATIONS

"Bluetooth Accessory Design Guidelines for Apple Products", Apple, Retrieved from Internet: https://developer.apple.com/hardwaredrivers/BluetoothDesignGuidelines.pdf, 2013, 40 pages.

*Primary Examiner* — Paras D Shah
(74) *Attorney, Agent, or Firm* — HPI Patent Department

(57) ABSTRACT

In an example, an audio signal may be routed to an audio device based on an indication of audio device historical usage, a measure of audio quality of the audio device, or a combination thereof.

20 Claims, 4 Drawing Sheets

(56) References Cited

U.S. PATENT DOCUMENTS

| | | | |
|---|---|---|---|
| 2012/0238215 A1 | 9/2012 | Kari et al. | |
| 2014/0241545 A1* | 8/2014 | Siegumfeldt | H04R 3/00 |
| | | | 381/80 |
| 2014/0376737 A1 | 12/2014 | Goldman | |
| 2015/0124976 A1* | 5/2015 | Pedersen | A61N 1/36038 |
| | | | 381/23.1 |
| 2016/0057537 A1* | 2/2016 | Robinson | H04R 5/04 |
| | | | 381/77 |
| 2016/0080908 A1* | 3/2016 | Julian | H04W 4/029 |
| | | | 455/457 |
| 2016/0255398 A1* | 9/2016 | Lee | H04N 21/8106 |
| | | | 348/462 |
| 2017/0186440 A1* | 6/2017 | Long | G10L 19/008 |
| 2017/0361213 A1* | 12/2017 | Goslin | A63F 13/20 |
| 2018/0233137 A1* | 8/2018 | Torok | G10L 15/22 |

* cited by examiner

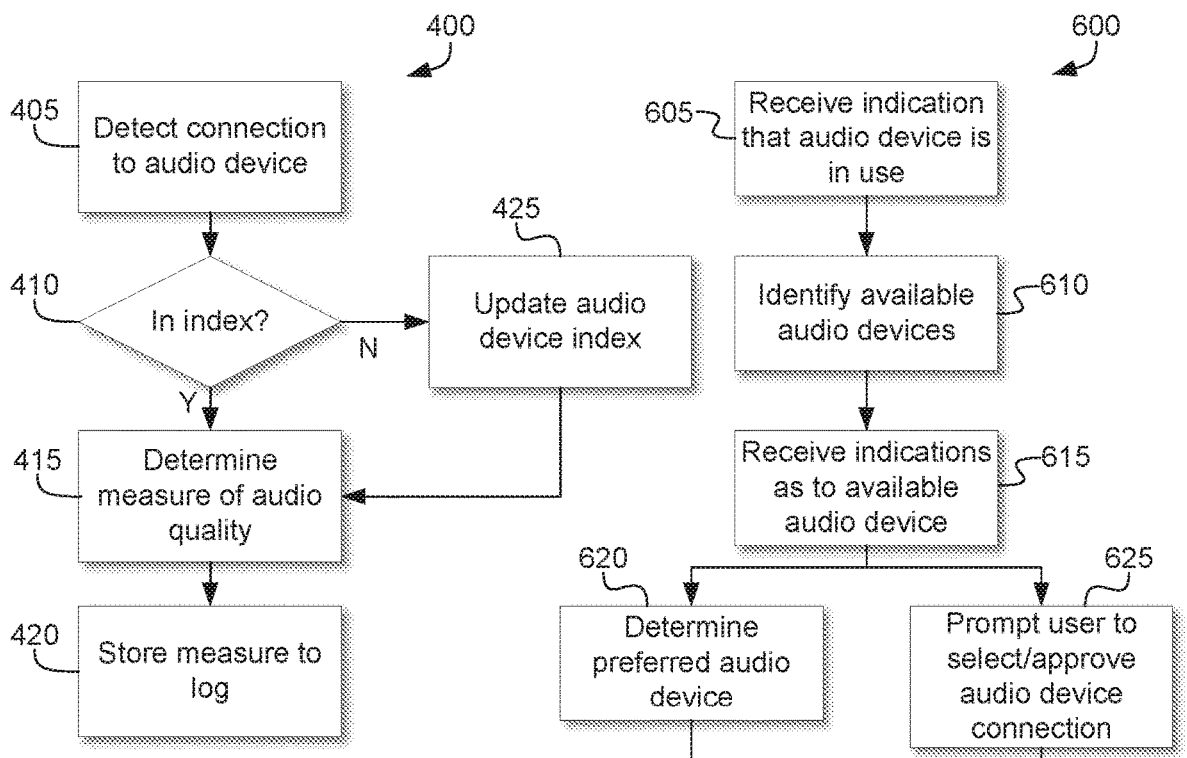
FIG. 4
FIG. 6
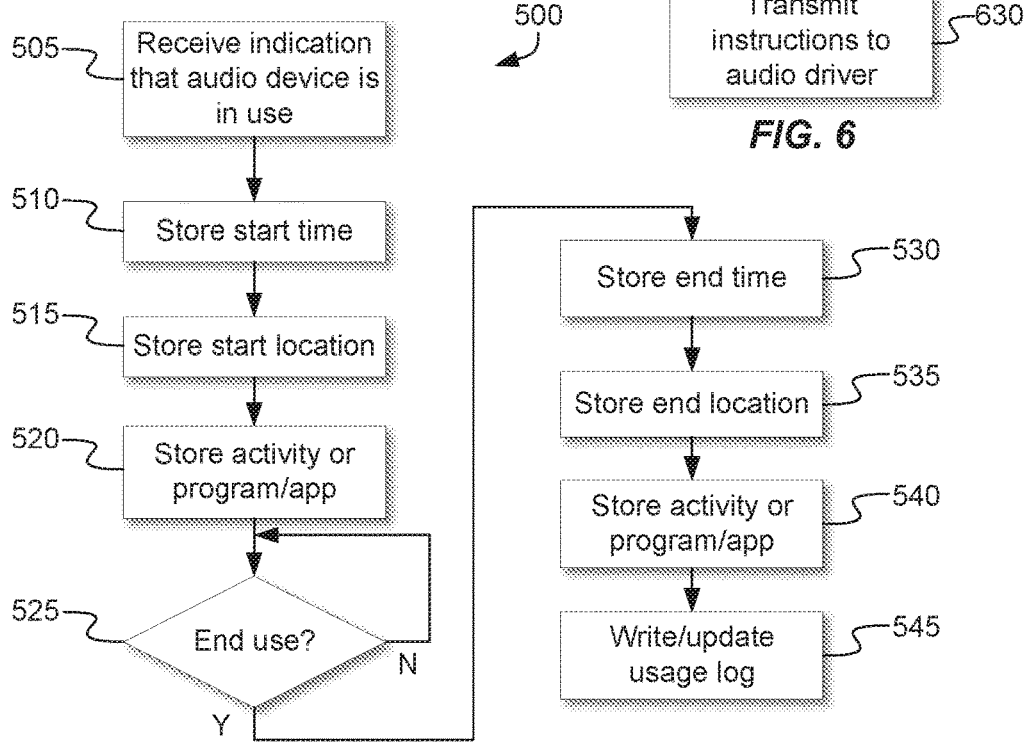
FIG. 5

AUDIO SIGNAL ROUTING TO AUDIO DEVICES

BACKGROUND

Some devices may be able to transmit audio signals to audio devices. For instance, a computing device may have a system speaker, external speakers connected through a 3.5 mm jack, and a BLUETOOTH connection to a wireless headset.

BRIEF DESCRIPTION OF THE DRAWINGS

Various examples are described below by referring to the following figures.

FIG. 4 is a flow chart for an example method for measuring audio quality;

FIG. 5 is a flow chart for an example method for monitoring usage;

FIG. 6 is a flow chart for an example method for routing audio signals; and

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

Computing devices (e.g., mobile devices, notebooks, etc.) may connect to audio devices via a signal routing path over which audio signals may be transmitted or received. The signal routing path may comprise a tangible path (e.g., over a wire or a trace) or an intangible path (e.g., over air via radio signals). However, in at least some cases, computing devices may not be capable of efficiently routing audio signals to connected audio devices. For instance, in the context of some technologies, a selected audio route may be maintained until a connection of the audio route fails (e.g., an audio device is disconnected, loses battery power, etc.).

Maintaining an audio route in the absence of a failure may be inefficient, at least because it may ignore potentially desirable audio devices, audio devices with more charge, or audio devices with better audio quality. For example, audio routes with better audio quality may be available, but may not be used. Additionally, certain audio routes may be desirable at certain times or locations (e.g., an audio route to a BLUETOOTH headset (BLUETOOTH is a trademark referring to a wireless transmission standard managed by the Bluetooth Special Interest Group (SIG)) may be favored to an audio route to a car audio device for voice calls). Furthermore, as power sources for audio devices lose charge, it may be desirable to select a connection to an alternate audio device to avoid loss of connection. In addition, selecting an audio route may be unnecessarily complex for users. For example, a user desiring to switch from one audio route (e.g., to a BLUETOOTH headset) to another audio route (e.g., a BLUETOOTH link to a home stereo system) may have to access device settings, unpair one audio device and subsequently pair a desired audio device. There may therefore be a desire for a device capable of routing audio signals to an audio device based on a measure of audio quality of an audio route or audio device, an indication of historical usage of an audio device, an indication of charge level of an audio device, or a combination thereof.

Figure 1:
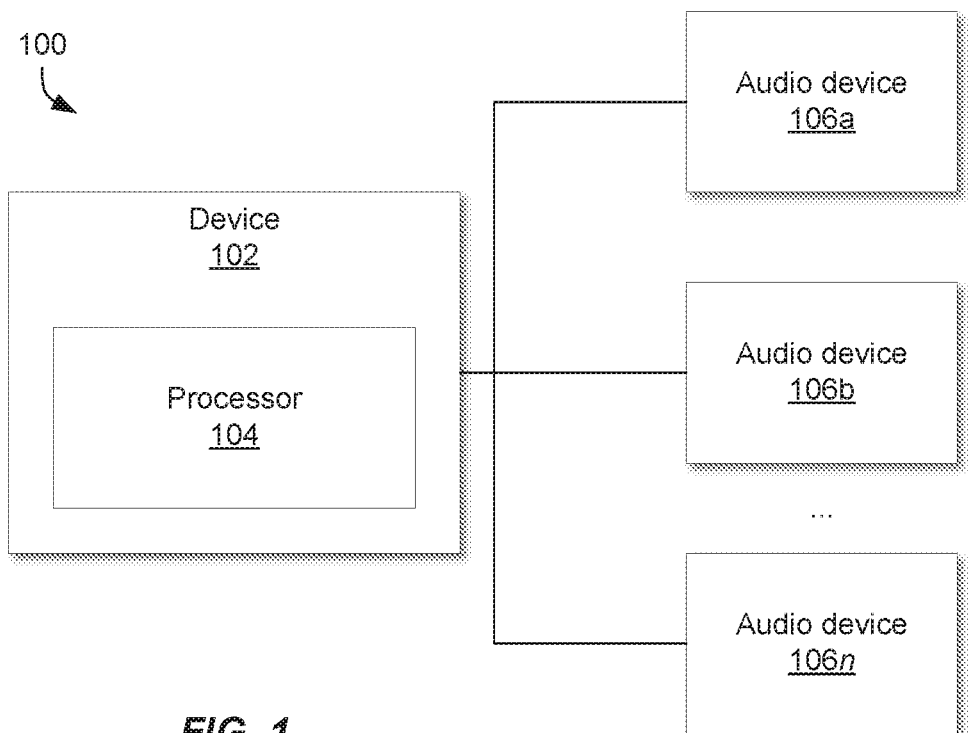
FIG. 1 illustrates an example system for routing audio signals.

FIG. 1 illustrates an example system 100 comprising a device 102 having a processor 104, and n audio devices (106a-106n) communicably connected (e.g., either a tangible or intangible connection) to device 102. Device 102 may comprise a number of possible devices having a processor, such as processor 104, and capable of transmitting audio signals to and/or receiving audio signals from audio devices 106a-106n. For example, a personal computer (PC), such as a desktop, a laptop, or a notebook computer may comprise suitable examples of device 102, as may a workstation, a thin client, a mobile device (e.g., a PDA, cellular telephone, tablet, a portable music player, etc.), and other like devices, by way of non-limiting example.

Processor 104 comprises a mechanism capable of receiving, processing, and transmitting signals. For example, processor 104 may comprise an integrated circuit (IC) comprising a number of transistors. Processor 104 may thus use the transistors to interpret and execute instructions. Examples of processor 104 may thus include both single and multi-chip processing units, such as central processing units (CPUs), field programmable gate arrays (FPGAs), and application-specific integrated circuits (ASICs), to name but a few examples. In one case, and as shall be discussed in greater detail hereinafter, processor 104 may be capable of enabling transmission of signals to one or more of audio devices 106a, 106b, and 106n.

Audio devices 106a-106n may comprise audio devices capable of transmitting and/or receiving audio signals. For example, a BLUETOOTH headset may be capable of receiving audio signals from device 102, such as in a form of voice or multimedia audio signals having an electric format, and outputting the received signals, such as by converting the electric audio signals into sound waves. The example BLUETOOTH headset may be further capable of receiving audio, such as in a form of spoken audio waves, and converting the spoken audio waves into signals for transmission to device 102, such as, for example, by converting the spoken audio waves into electric audio signals. Other example audio devices may include wired and wireless speakers, without limitation. A connection between device 102 and audio devices 106a-106n is referred to herein as a communications channel. A communications channel spans tangible portions (e.g., a bus) of an audio signal routing path between a device and an audio device. It may also span non-tangible portions (e.g., air) of the audio signal routing path. Nevertheless, claimed subject matter is not directed to non-transitory media.

In a number of cases, one audio device, such as audio device 106a, may be favored over other audio devices, such as audio device 106b. Usage history may be based, for example, on ease-of-use, location of use, and time of use, to name but a few examples. Thus, in some cases, there may be a desire to switch among multiple audio devices 106a-106n during the course of a given period of time.

Figure 2:
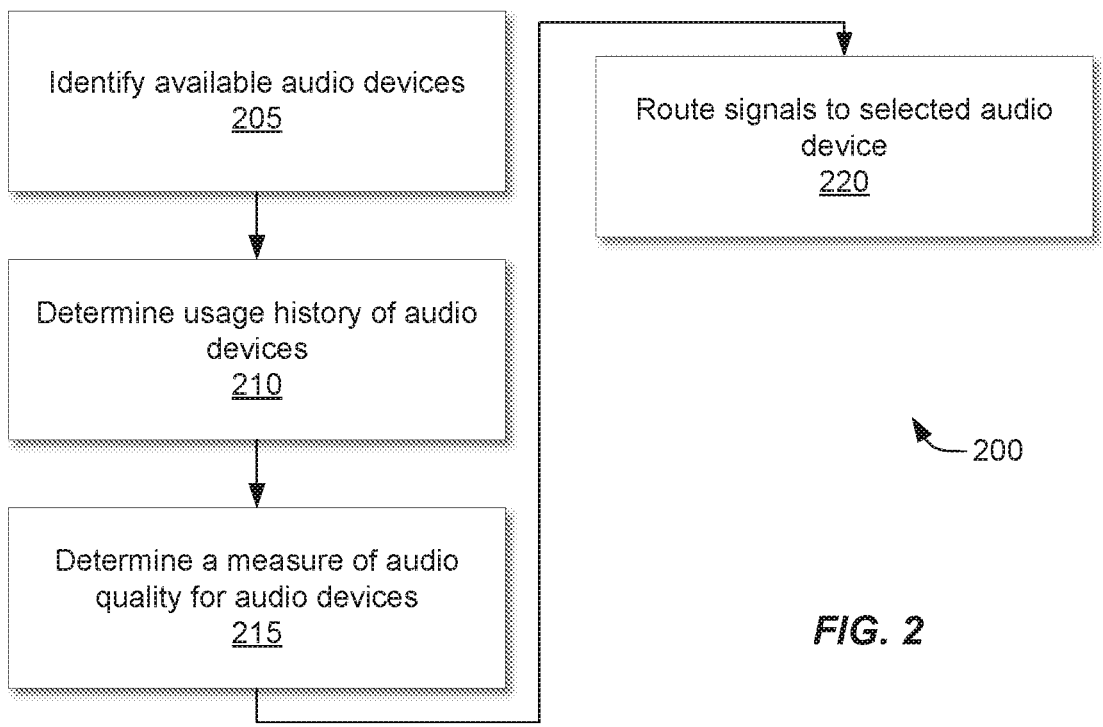
FIG. 2 is a flow chart for an example method for routing audio signals.

Turning now to FIG. 2, an example method 200 is illustrated. Method 200 is one example process for routing audio signals to audio devices. FIG. 1 will be used to provide a non-limiting illustration of method 200. At block 205, available audio devices are identified. In one example, device 102 in FIG. 1 may be capable of identifying audio devices 106a-106n. In one case, computer-executable instructions stored in a computer-readable medium may be fetched and executed by processor 104 to identify audio devices available to device 102. In one case, for example, device 102 may have a number of wireless pairings (e.g., BLUETOOTH, AIRPLAY (AIRPLAY is a trademark owned by Apple, Inc., referring to a wireless transmission protocol), IEEE 802.11x, etc.) and wired pairings (e.g., USB devices, 3.5 mm audio, etc.). However, at a given time, a portion of pairings may be inactive. At block 205 of FIG. 2, device 102 may identify available audio devices connected via either a wired connection or a wireless connection. In at least some cases, it may be desirable to omit unconnected audio devices from subsequent routing determinations, such as to reduce processing overhead, by way of example.

Device 102 may determine usage history of audio devices 106a-106n such as illustrated at block 210 of FIG. 2. Audio devices 106a-106n, which may have been identified at block 205, may have been connected to device 102 previously, and a number of characteristics of the connections may be used in order to determine usage history. For example, values descriptive of connection times (e.g., time of day, start time, stop time, duration, etc.), connection locations (e.g., geographic locations corresponding to longitude and latitude coordinates, recognized locales, such as home, work, vehicles, etc.), and signal content (e.g., voice signals, multimedia audio signals, etc.) may be stored in a log of usage history. The log of usage history may be stored locally on device 102 or may be stored remotely, such as in a computer-readable medium of a remote server. Furthermore, the log of usage history may be used to generate a preference list, which may be in the form of one or more tables of a database or other such mechanism for storing signals and/or states. The preference list may be updated in response to changes to the log of usage history. For example, at a first time, a preference list may contain a number of usage preferences for audio devices 106a and 106b. At a second time, responsive to a connection to a new audio device, audio device 106n, the preference list may be updated to reflect changes to usage preferences based on the newly connected audio device 106n.

Device 102 may determine a measure of audio quality for audio devices 106a-106n. To determine a measure of audio quality for audio devices 106a-106n, processor 104 of device 102 may execute instructions stored on a computer-readable medium. Responsive to execution of the instructions, device 102 may determine a measure of audio quality of devices 106a-106n. The measure of audio quality may be based on a number of characteristics, which may be stored, locally or remotely, in a computer-readable medium. Sample characteristics include, but are not limited to, a number of dropped signal packets, loudness, jitter, harmonic-to-noise ratio, signal-to-noise ratio, shimmer, and echo.

Packet loss refers to signal packets containing audio data that are lost between transmission and reception over an audio routing path. For example, for an example wireless headset, signal packets containing audio signals transmitted from a device to the headset may not be received correctly at the headset. The signal packets may have identifying features (e.g., written in a header portion of a signal packet) that may allow identification of lost packets. Lost packets may be tracked in a log of audio quality for a particular device.

As used herein, loudness refers to an indication of user perception of signal strength on a scale from loud to quiet. A number of possible measures of loudness exist and in the context of the present disclosure may include Loudness, K-weighted, relative to Full Scale (LKFS), ISO 532A, ISO 532B, DIN 45631, ASA/ANSI 53.4, according to present understandings thereof and those that may be developed in the future. At times, loudness may correlate with sound strength (e.g., sound pressure, such as in decibels), sound intensity, and sound power. Values indicating loudness of an audio signal may be periodically measured and stored in a log of audio quality.

Jitter refers to timing uncertainty as to the sampling of an audio signal. Jitter may be expressed in terms of a deviation from a periodic signal and may be quantified using root mean square (RMS), peak-to-peak displacement, or spectral density, by way of non-limiting example. Values indicating jitter of an audio signal may be periodically stored in a log of audio quality. Shimmer is a measure of cycle-to-cycle variation in signal amplitude. Measures of shimmer for a particular audio route or audio device may also be periodically stored in a log of audio quality. Echo refers to a sound reflection arriving to a listener at a delay after the direct sound. While echo may be expressed in dB, indicating the strength of an echo, in the context of the present application, it may be of interest to use a binary indication of echo (e.g., whether or not echo is detected on a signal). In any case, an indication of echo may be periodically stored in a log of audio quality.

The harmonic-to-noise ratio (HNR) is a quantification of comparative noise in a signal, HNR may be expressed in decibels (dB). To illustrate one example expression of HNR, if 99% of the energy of a signal is periodic and 1% is noise, then the HNR may be determined as $10*\log_{10}(99/1)=20$ dB. The HNR of a particular audio route or audio device may also be periodically stored in a log of audio quality.

The signal-to-noise ratio (SNR) is a ratio of signal power to noise power. The SNR of an audio signal may be expressed in dB. For example, similar to the HRN, the SNR may be expressed in dB as $10 \log_{10}(P_{signal}/P_{noise})$. The SNR of a particular audio route or audio device may also be periodically stored in a log of audio quality.

In one case, one or more of the foregoing audio quality characteristics may be used to determine a measure of audio quality. For example, a log of audio quality may store values for a particular audio route and/or audio device in the form of signals or states. Values in the log of audio quality may be normalized and possible audio routes and audio devices may be compared using the normalized values. It may be desirable, for example, to rank possible audio routes based on audio quality measurements.

Device 102 may route signals to a selected audio device based on the determined usage history and measure of audio quality for audio devices, such as illustrated at block 220 of FIG. 2. For example, instructions may be executed by processor 104 to determine, based on the usage history and audio quality, which audio device of audio devices 106a-106n (and, by extension, audio route) to use. It may be possible to prompt a user, such as via a user interface (UI), to select an audio route based on possible audio routes ranked by usage frequency and audio quality. For instance, device geolocation may be used to determine if device 102 arrives at a location identified as being a "home" location, and, responsive to the geolocation determination, usage history may be queried and suggest a preference to connect device 102 to a home stereo receiver (e.g., audio device 106b) through a BLUETOOTH connection. However, a wired headset (e.g., audio device 106a) may be connected to device 102 and may have a greater measure of audio quality than a wireless connection to the home stereo receiver, audio device 106b in this example. Therefore, device 102 may prompt a user to confirm a wireless connection to a home stereo (e.g., audio device 106b). Assuming that the wireless connection is confirmed, device 102 may transmit signals to the wirelessly connected home stereo (e.g., audio device 106b).

A further example of how signals may be routed to a selected audio device as illustrated at block 220 of FIG. 2 includes a case in which an audio device charge level may be insufficient to allow the audio device to operate during a predicted (e.g., based on usage history) period of time. For instance, if device 102 is connected to a wireless headset, such as represented by audio device 106a in FIG. 1, it may be determined that a charge level of audio device 106a may not be sufficient to power audio device 106a throughout an entire operational period expected based on usage history (e.g., a commute between a home location and a work location). Device 102 may determine, however, that an audio route to a car stereo (e.g., audio device 106b) is available as is a connection to a speaker of device 102 (e.g., audio device 106n). Device 102 may determine based on a preference log that a car stereo (e.g., audio device 106b) connection is preferred to a connection to the speaker of device 102 (e.g., audio device 106n) and may prompt a user, such as prior to a charge level of audio device 106a reaching a level at which operation may be hindered, to select a connection to the car stereo (e.g., audio device 106b) to avoid potentially undesirable audio device disconnection.

Yet another example use case of method 200 comprises the possibility of dividing and routing portions or categories of audio signals based on preferences. For example, if two BLUETOOTH devices (e.g., audio devices 106a and 106b) are available supporting transmission and reception of both voice and multimedia, device 102 may be able to determine, based on usage history and audio quality, which audio device to use for voice signals and which audio device to use for multimedia signals. In one non-limiting illustrative case, a user may be notified of the incoming call and prompted to route voice signals to the BLUETOOTH headset (audio device 106a), such as via a visual cue on a screen of device 102 (e.g., a button), an audio signal over the stereo (e.g., "Incoming call. Receive via BLUETOOTH headset?"), haptic feedback (e.g., a buzz of device 102), etc.

Figure 3:
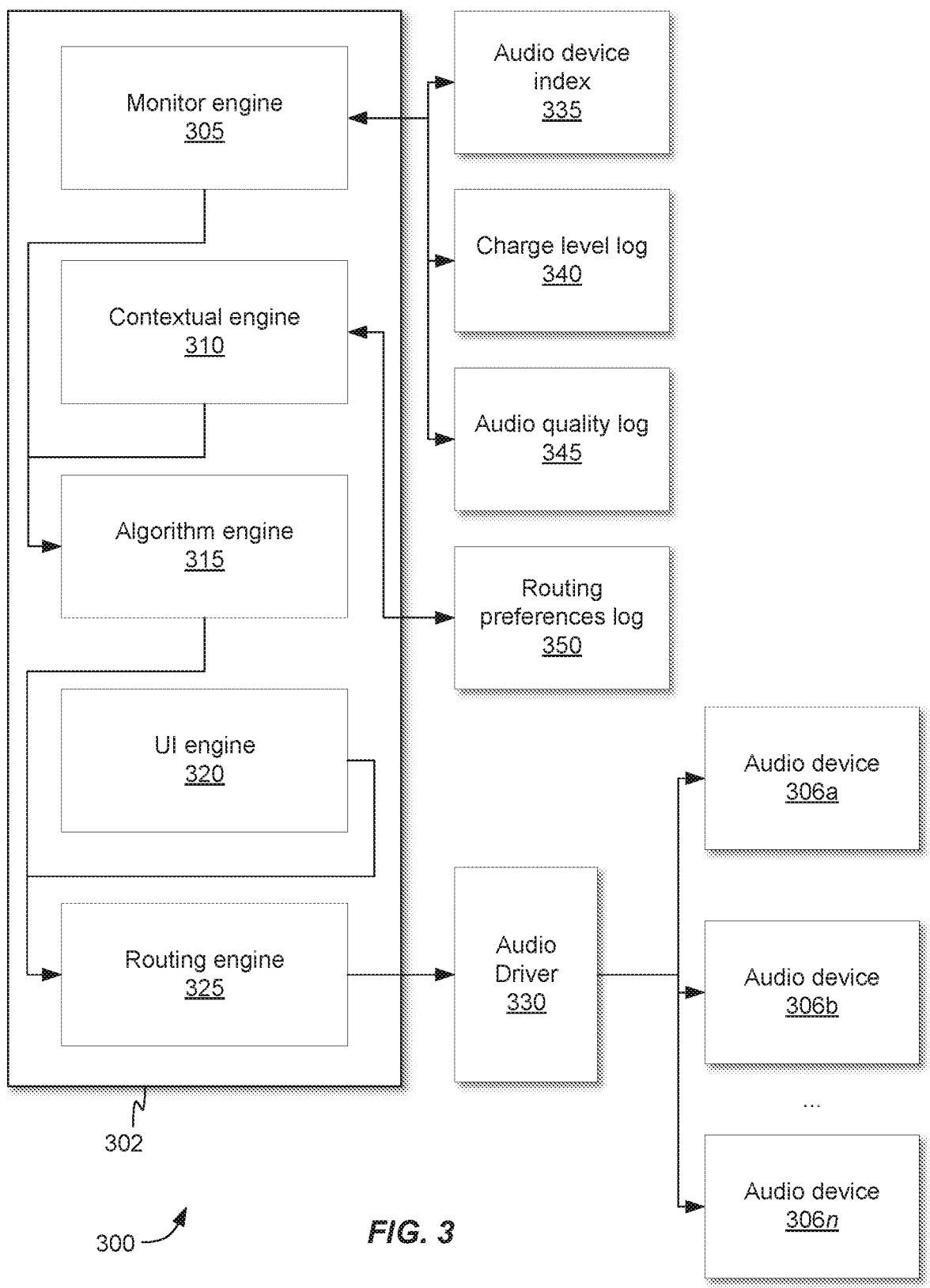
FIG. 3 is a schematic diagram of an example system for routing audio signals.

FIG. 3 illustrates an example device 302, similar to device 102 of FIG. 1, capable of performing method 200 of FIG. 2. FIG. 3 illustrates device 302 having a monitor engine 305, a contextual engine 310, an algorithm engine 315, a user interface (UI) engine 320, and a routing engine 325, which comprise processing components, such generated responsive to execution of instructions by a processor of device 302. It is to be understood, however, that though monitor engine 305, contextual engine 310, algorithm engine 315, user interface (UI) engine 320, and routing engine 325 are illustrated in device 302, at times one or more of the processing components may be located remotely to device 302. For example, in one case, determinations as to usage history, audio quality, and routing (e.g., monitor engine 305, contextual engine 310, and/or algorithm engine 315) may be performed on a remote device (e.g., a remote server) and the result of the determinations may be transmitted to device 302, Such approaches may be desirable when, for example, it may be desired to reduce a processing load on device 302.

In one implementation, monitor engine 305 may comprise processing functionality enabled responsive to execution of instructions by a processor of device 302 to track audio devices (e.g., a list of all possible audio devices, available audio devices, etc.), track audio device charge level (e.g., battery levels for audio devices, as applicable), and track audio quality of audio devices and/or audio routes. Thus, monitor engine 305 may be able to access an audio device index 335, an audio device charge level log 340, and an audio quality log 345. Audio device index 335, audio device charge level log 340, and audio quality log 345 may be stored locally on device 302, such as in a computer-readable medium, or remotely.

Contextual engine 310 may comprise processing functionality enabled responsive to execution of instructions by a processor of device 302 to track user audio usage patterns such as, for example, time playing music, watching videos, on voice calls, duration of connection to a particular audio device, locations of connection, etc. As discussed above, usage patterns may be stored in a usage log and may be used to determine a preference log or list, such as routing preferences log 350. Routing preferences log 350 may be stored locally on device 302 or remotely.

Algorithm engine 315 may comprise processing functionality enabled responsive to execution of instructions by a processor of device 302 to receive signals from monitor engine 305 and contextual engine 310 and determine whether to identify additional audio routes and whether to reroute audio signals. Algorithm engine 315 may be capable of transmitting signals to routing engine 325, such as for rerouting audio signals to an audio device.

UI engine 320 may comprise processing functionality enabled responsive to execution of instructions by a processor of device 302 to receive a list of available audio devices and transmit signals to prompt a user to select a route. For instance, in one example, UI engine 320 may be capable of transmitting audio-visual or haptic prompts to a user for confirmation of audio signal routing. Thus, for example, UI engine 320 may be communicably coupled to a display of device 302 capable of displaying a list of available audio devices and prompting a user to select one of the available audio devices for audio routing.

Routing engine 325 may comprise processing functionality enabled responsive to execution of instructions by a processor of device 302 to enable audio signal routing to a desired audio device, such as audio devices 306a-306n. In one implantation, routing engine 325 may route signals through an audio driver 330 (e.g., an integrated driver), which may be included in device 302, or which may be located external to device 302 (e.g., a USB driver), and which may be capable of driving signals to a selected audio device of audio devices 306a-306n. The operation of the foregoing portions of an example system 300 for routing audio signals will be described in conjunction with FIGS. 4-6.

FIG. 4 illustrates an example method 400 for tracking and measurement of audio quality of an audio device and/or audio routing path. Audio quality may be tracked periodically, such as while an audio device is connected to a device. For example, and using system 300 of FIG. 3 to illustrate, a connection between audio device 306a and device 302 may be detected, such as illustrated in block 405 of FIG. 4. Thus, if audio device 306a comprises a BLUETOOTH headset, upon pairing audio device 306a and device 302, monitor engine 305 may be alerted to the connection and may perform certain audio device monitoring functionality. For example, monitor engine 305 may query an index, such as audio device index 335, to determine whether the connected device, audio device 306a, is already included, such as shown by block 410 of FIG. 4. If audio device 306a is a new device and not yet in audio device index 335, then audio device index 335 may be updated, such as shown at block 425 of FIG. 4.

Method 400 of FIG. 4 also may include determining a measure of audio quality of device 306*a* at block 415. Returning to device 302 of FIG. 3, monitor engine 305 may be capable of using, for example, an indicator of dropped packets, loudness, jitter, HNR, SNR, shimmer, or echo to determine a measure of audio quality of device 306*a*. For instance, audio quality log 345 may be updated based on the determined measure of audio quality, such as shown at block 420 of FIG. 4.

FIG. 5 illustrates an example method 500 for monitoring audio device usage patterns and updating an audio preference log. At block 505, an indication is received that an audio device is in use. Thus, for instance, contextual engine 310 of FIG. 3 may receive an indication that audio device 306*a* is connected to device 302. A connection start time may be stored, as shown at block 510 in FIG. 5. In the example of FIG. 3, the connection start time may be stored in routing preferences log 350. Additionally, as shown at block 515 of method 500, a start location may be determined (e.g., using device geolocation) and stored in routing preferences log 350. And, as shown at block 520 of method 500, an activity or application or program may be stored in routing preferences log 350. For example, if a music player application is transmitting audio signals to audio device 306*a* at block 520, that information may be stored in routing preferences log 350, and may be associated with the start time and start location to enable a determination that at the stored time and place, there might be a preference to use audio device 306*a* and play music through the detected music player application. An activity (e.g., driving) may also be associated with determined times and locations.

At block 525 of FIG. 5, a determination as to whether audio device 306*a* is still connected may be made. For instance, returning to FIG. 3, contextual engine 310 may determine that audio device 306*a* is no longer connected to device 302. An end time may be stored, such as shown at block 530 of method 500, such as in routing preferences log 350. The stored end time may be used in conjunction with the stored start time (e.g., at block 510) to determine a connection duration. Thus, for example, contextual engine 310 may be capable of determining preferences as to start time, end time, and connection duration, by way of example. Furthermore, as shown at block 535, an end location may be determined (e.g., using device geolocation), stored, and may be usable by contextual engine 310 to determine, for example, that there may be a preference to route audio to audio device 306*a* at a location corresponding to the stored start location (e.g., at block 515) and to cease routing audio to audio device 306*a* at a location corresponding to the stored end location. Additionally, an ending activity or program or application may be stored, such as shown at block 540. For instance, if it is determined that audio routing to audio device 306*a* ceased when a detected activity was undertaken (e.g., driving, working out, eating, etc.), then the stored activity may be usable by contextual engine 310 to determine a preference for ceasing to route audio to audio device 306*a* corresponding to the stored activity. Similarly, stored applications or programs may also be used by contextual engine 310 to facilitate usage pattern-based audio routing determinations.

A usage log may be written or updated, as illustrated at 545 of FIG. 5, based on the values stored by contextual engine 310. For instance, usage preferences as to audio devices, times, durations, locations, activities, programs, and applications may be used to generate or update routing preferences log 350. And routing preferences log 350 may be consulted, such as by contextual engine 310, to facilitate audio routing.

FIG. 6 illustrates an example method 600 for routing audio to audio devices, such as audio devices 306*a*-306*n* of FIG. 3. Algorithm engine 315 may be capable of receiving signals from monitor engine 305 and contextual engine 310 to determine whether or not to look for available audio routes, such as to reroute audio signals.

As discussed above, rerouting audio signals may be based on usage history, audio quality, and charge level, among other things. For instance, at block 605 of method 600, algorithm engine 315 may receive an indication that an audio device, such as audio device 306*a*, is in use.

At block 610 of method 600, algorithm engine 315 of FIG. 3 may identify additional audio devices. For instance, algorithm engine 315 may request an indication from monitor engine 305 as to available audio devices. In one example, monitor engine 305 may provide algorithm engine 315 with an indication that in addition to audio device 306*a*, audio devices 306*b* and 306*n* are also available. Thus, algorithm engine 315 may be able to determine whether audio should be routed to either of audio devices 306*b* or 306*n* rather than continue to route audio signals to audio device 306*a*, by way of example. For example, and as illustrated at block 615 of method 600, algorithm engine 315 may receive indications from monitor engine 305 and contextual engine 310 as to available audio devices (e.g., audio devices 306*b* and 306*n*) in order to determine whether a connection to either available audio device would be suitable (e.g., whether sufficient charge, consistent with audio preferences, audio quality, etc.).

To provide a non-limiting illustration, an example including a transition to a car is offered for consideration. For instance, if device 302 is transitioning to a car with an available stereo (e.g., audio device 306*b*), algorithm engine 315 may determine that audio should be routed to audio device 306*b* rather than audio device 306*a*, such as illustrated at block 620 of method 600. In one implementation, this transition may occur automatically based on available preference, charge level, and audio quality values. In another case, the transition may occur after prompting a user, such as illustrated at block 625 of method 600. It may be that algorithm engine may prompt a user to approve the audio signal rerouting for all subsequent cases (e.g., "allow audio to be rerouted to audio device 306*b* in the future without prompting me," etc.).

Routing engine 325 of FIG. 3 may use input from algorithm engine 315 and UI engine 320 to route audio signals to a desired audio device of audio devices 306*a*-306*n*. Thus, returning to the example of detecting an available audio route to a car stereo, responsive to indications by algorithm engine 315 and UI engine 320, routing engine 325 may transmit instructions to audio driver 330, such as illustrated at block 630 of method 600. Audio driver 330 may direct audio signals to the desired audio devices, such as audio device 306*b* in the case of the car stereo example. Of note, redirection of audio signals to another audio device may trigger an audio quality detection method, such as method 400 of FIG. 4, and a usage preferences method, such as method 500 of FIG. 5.

Figure 7:
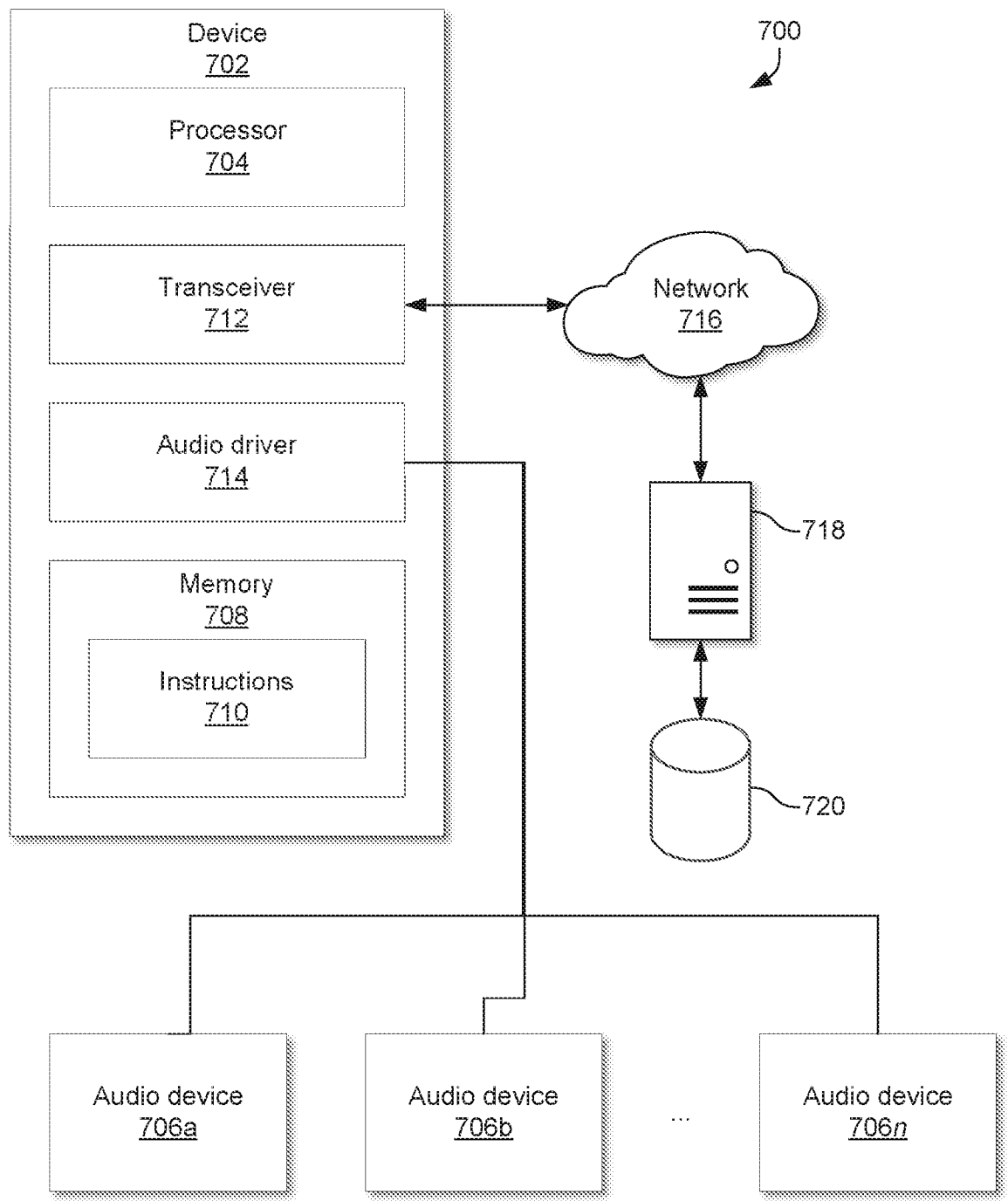
FIG. 7 illustrates and example system for routing signals using a remote device.

FIG. 7 illustrates an example system 700 for routing audio signals. System 700 includes a device 702 having a processor 704, a transceiver 712, an audio driver 714, and a memory 708 having instructions 710 stored thereon. Device 702, processor 704, audio driver 714, and memory 708 may be similar to corresponding portions of previously discussed implementations. Transceiver 712 comprises a mechanism capable of transmitting and receiving signals with devices external to device 702. Transceiver 712 may comprise a wireless or wired transceiver including, but not limited to, a modem, a 802.11x transceiver (e.g., BLUETOOTH or WIFI transceiver), a cellular transceiver (e.g., 3G, LTE, etc.), by way of non-limiting example. For instance, in one case, transceiver 712 may enable device 702 to exchange signals, via network 716, with a remote device 718. Network 716 may comprise a public or private network, such as the Internet, an intranet, a virtual private network (VPN), or other like communications network. Remote device 718 may comprise a computing device, such as a server, and may be capable of storing information as to audio routing of device 702. For instance, remote device 718 may be capable of storing an audio device index, such as audio device index 335 of FIG. 3, a charge level log, such as charge level log 340, an audio quality log, such as audio quality log 345, and a routing preference log, such as routing preferences log 350 within database 720, Storing audio routing information remotely to device 702 may be desirable in certain circumstances, such as to reduce processing and storage overhead for device 702 or to allow users to access and alter audio routing parameters remotely from device 702. For instance, in one case, a user may be able to remotely access audio routing parameters for his or her device (e.g., indicating a preference to route audio to a home stereo at home, to a BLUETOOTH headset at work, to an a car stereo while commuting, etc.), such as on a website, to potentially reduce user prompts for audio routing, among other things. Thus, system 700 may be capable of implementing the functionality discussed in FIGS. 2 and 4-6 by way of non-limiting example, without departing from claimed subject matter.

As discussed above, audio signals may be routed to audio devices using, for example, historical usage information for audio devices and a measure of audio quality. Among other things, this may allow a device to selectively route audio signals to an audio device based on usage preferences such as usage patterns for a particular device including connection time, connection location, and activities (e.g., driving, cooking, etc.).

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A device comprising:
a plurality of communications channels spanning an audio signal routing path between the device and corresponding audio devices; and
a processor to:
generate a preference list based on indications of audio device historical usage stored in a log of usage history, the preference list reflecting usage preferences for the corresponding audio devices;
normalize values of audio quality for the corresponding audio devices stored in a log of audio quality and comprising measures of audio quality;
compare the corresponding audio devices based on the to be normalized values of audio quality; and
select a communications channel among the plurality of communications channels to route an audio signal, via the to be selected communications channel, to a selected audio device corresponding to the to be selected communications channel of the audio devices based on both the preference list and a comparison of the to be normalized values of audio quality.

2. The device of claim 1, wherein the indications of audio device historical usage comprise an audio device time of usage comprising a time of day, a duration, a start or stop time, or a combination thereof.

3. The device of claim 1, wherein the indications of audio device historical usage comprise a location at which the audio device has been used by the device.

4. The device of claim 3, wherein the indications of audio device historical usage comprise a geolocation of the device.

5. The device of claim 1, wherein the measures of audio quality comprise dropped packets, loudness, jitter, harmonic-to-noise ratio, signal-to-noise ratio, shimmer, echo or a combination thereof.

6. The device of claim 1, wherein the processor is to route voice signals to the audio device and route multimedia signals to a second audio device.

7. The device of claim 1, wherein the indications of audio device historical usage comprise values descriptive of connection times, connection locations, and signal content.

8. The device of claim 1, wherein the processor is further to update the preference list in response to detection of a new audio device.

9. The device of claim 1, wherein the processor is further to select a different communications channel among the plurality of communications channels based on device geolocation.

10. The device of claim 1, wherein the processor is further to select a different communications channel among the plurality of communications channels in response to an indication of charge level of the device.

11. The device of claim 1, wherein the processor is further to select a different communications channel among the plurality of communications channels for routing audio signals of a second category and transmitting audio signals of a first category via the to be selected communications channel and the selected audio device.

12. The device of claim 1, wherein the processor is further to update an audio device index to include audio devices of the corresponding audio devices not already included in the audio device index.

13. The device of claim 1, wherein the processor is further to associate an activity with times and locations indicated in the log of usage history and base generation of the preference list with the to be associated activity.

14. A method comprising:
identifying, using a processor of a computing device, available audio devices that are connected to the computing device via either a wired connection or a wireless connection;
determining, using the processor, a usage history of the audio devices, wherein the determining the usage history comprises generating a preference list containing usage preferences for the audio devices;
determining, using the processor, a measure of audio quality for the audio devices;
normalizing, using the processor, the measure of audio quality for the audio devices;

comparing, using the processor, the audio devices based on normalized measures of audio quality for the audio devices and also based on the preference list containing usage preferences for the audio devices;

selecting an audio device among the available audio devices and a corresponding communications channel spanning an audio signal routing path between the computing device and the selected audio device, the selecting based on the comparing of the audio devices based on the normalized measures of audio quality and the preference list; and routing signals to the selected audio device of the available audio devices.

15. The method of claim 14, further comprising responsive to a determination that a first audio device is unconnected, omitting the first audio device from determinations of usage history and audio quality.

16. The method of claim 14, wherein determining the measure of audio quality comprises determining using received indications of dropped packets, loudness, jitter, harmonic-to-noise ratio, signal-to-noise ratio, shimmer, echo or a combination thereof.

17. The method of claim 16, further comprising using the determined measure of audio quality for a plurality of audio devices and selecting the audio device with the highest measure of audio quality.

18. The method of claim 14, further comprising transmitting a UI prompt based on the comparison of the normalized measures of audio quality and also based on the preference list and receiving a user confirmation responsive to the UI prompt.

19. A remote device comprising:
a transceiver via which the remote device is connected to a user device connected to a plurality of audio devices;
a non-transitory computer-readable medium; and
a processor to:
store indications of historical usage in a usage log stored in the computer-readable medium, the stored indications of historical usage descriptive of the plurality of audio devices by the user device;
store a preference list in the computer-readable medium, the preference list based on the stored usage log;
store normalized values of audio quality of the plurality of audio devices in the computer-readable medium; and
transmit, via the transceiver, audio device signal routing signals to a user device, the transmission of signals based on the to be stored preference list and the to be stored normalized values of audio quality and wherein the audio device signal routing signals are to enable selection of an audio device of the plurality of audio devices and a corresponding communications channel spanning an audio signal routing path between the user device and the selected audio device.

20. The remote device of claim 19, wherein the transceiver is further to receive indications of charge level of the audio devices, and wherein the processor is to also base the transmitted signals on the received indications of charge level.

* * * * *